(12) United States Patent
Martinez et al.

(10) Patent No.: US 11,861,533 B2
(45) Date of Patent: *Jan. 2, 2024

(54) NETWORK-BASED WORK ASSIGNMENT PLATFORM

(71) Applicant: NCR Voyix Corporation, Atlanta, GA (US)

(72) Inventors: Jennifer Lynn Martinez, Bedford, TX (US); Leon Hart Baker, Euless, TX (US); Phedra Lee Kinsel, Euless, TX (US); Jesse Vaughn, Jr., Frisco, TX (US); Diana Graciela Villarreal García, Carrollton, TX (US); Jan Zajicek, Irving, TX (US)

(73) Assignee: NCR Voyix Corporation, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/951,833

(22) Filed: Sep. 23, 2022

(65) Prior Publication Data

US 2023/0012709 A1 Jan. 19, 2023

Related U.S. Application Data

(63) Continuation of application No. 16/845,792, filed on Apr. 10, 2020, now Pat. No. 11,461,710.

(51) Int. Cl.
| | |
|---|---|
| *G06Q 10/0631* | (2023.01) |
| *G06Q 10/1093* | (2023.01) |
| *G06N 20/00* | (2019.01) |
| *G06F 16/9035* | (2019.01) |
| *G06F 16/9038* | (2019.01) |
| *G06Q 40/12* | (2023.01) |

(52) U.S. Cl.
CPC ... *G06Q 10/06311* (2013.01); *G06F 16/9035* (2019.01); *G06F 16/9038* (2019.01); *G06N 20/00* (2019.01); *G06Q 10/1097* (2013.01); *G06Q 40/125* (2013.12)

(58) Field of Classification Search
CPC .......... G06Q 10/00–50/00; G06F 1/00–40/00; G06N 1/00–20/00
USPC ............................................. 705/7.11–7.42
See application file for complete search history.

(56) References Cited

U.S. PATENT DOCUMENTS

| | | | |
|---|---|---|---|
| 7,472,097 B1* | 12/2008 | Scarborough | G06N 3/045 706/26 |
| 9,734,219 B1* | 8/2017 | Balasia | G06F 16/9535 |
| 10,296,873 B1* | 5/2019 | Balasia | G06F 16/24578 |
| 10,510,045 B2* | 12/2019 | Balasia | G06F 16/24578 |
| 10,685,291 B2* | 6/2020 | Fang | G06Q 10/105 |
| 2002/0016728 A1* | 2/2002 | Toyoda | G06Q 10/063112 705/7.14 |

(Continued)

*Primary Examiner* — Alan S Miller
(74) *Attorney, Agent, or Firm* — Schwegman Lundberg & Woessner, P.A.

(57) ABSTRACT

A network-based work assignment platform is provided. Employers and workers are registered on the platform. A registered employer posts a temporary job on the platform. The platform matches a registered worker to the temporary job. The platform facilitates, coordinates, and monitors performance of the temporary job by the registered worker and processes payment to the registered worker for performance of the temporary job on behalf of the registered employer.

20 Claims, 4 Drawing Sheets

(56) References Cited

U.S. PATENT DOCUMENTS

| | | | |
|---|---|---|---|
| 2002/0029160 A1* | 3/2002 | Thompson | G06Q 10/10 705/7.14 |
| 2002/0055870 A1* | 5/2002 | Thomas | G06Q 10/063112 705/7.14 |
| 2002/0072946 A1* | 6/2002 | Richardson | G06Q 10/06 705/7.14 |
| 2002/0123921 A1* | 9/2002 | Frazier | G06Q 10/063112 705/7.14 |
| 2002/0133369 A1* | 9/2002 | Johnson | G06Q 10/10 705/321 |
| 2004/0107192 A1* | 6/2004 | Joao | G06Q 10/06311 |
| 2006/0212448 A1* | 9/2006 | Bogle | G06Q 10/00 |
| 2007/0022113 A1* | 1/2007 | Heino | G06Q 30/00 |
| 2009/0204471 A1* | 8/2009 | Elenbaas | G06Q 10/06 726/28 |
| 2011/0276506 A1* | 11/2011 | Schmitt | G06Q 30/0207 705/321 |
| 2014/0095399 A1* | 4/2014 | Smith | G06Q 10/1053 705/321 |
| 2014/0317079 A1* | 10/2014 | Obernikhin | G06F 16/2468 707/706 |
| 2016/0104096 A1* | 4/2016 | Ovick | G06Q 10/063112 705/7.14 |
| 2017/0193394 A1* | 7/2017 | Fang | G06F 16/24556 |
| 2017/0270456 A1* | 9/2017 | Branagh | G06Q 10/06398 |
| 2017/0344554 A1* | 11/2017 | Ha | G06F 16/248 |
| 2017/0344555 A1* | 11/2017 | Yan | G06F 16/9535 |
| 2017/0344556 A1* | 11/2017 | Wu | G06F 16/9035 |
| 2017/0344954 A1* | 11/2017 | Xu | G06F 16/242 |
| 2018/0025309 A1* | 1/2018 | Absher | G06Q 10/063112 705/7.14 |
| 2018/0300687 A1* | 10/2018 | Lewin | G06Q 10/1093 |
| 2018/0301218 A1* | 10/2018 | Bochaton | G06Q 10/1053 |
| 2019/0108217 A1* | 4/2019 | Chen | G06F 40/289 |
| 2019/0164132 A1* | 5/2019 | Borje | G06Q 10/1053 |
| 2019/0259002 A1* | 8/2019 | Balasia | G06Q 10/1053 |
| 2020/0134569 A1* | 4/2020 | Taylor | G06Q 10/1053 |
| 2020/0394539 A1* | 12/2020 | Sethre | G06N 5/04 |

* cited by examiner

NETWORK-BASED WORK ASSIGNMENT PLATFORM

CROSS-REFERENCE TO RELATED APPLICATION

This application is a continuation of U.S. patent application Ser. No. 16/845,792, filed Apr. 10, 2020, which application and publication is incorporated herein by reference in its entirety.

BACKGROUND

A variety of socioeconomic factors have created an employment situation in the United States referred to as the "gig economy." Employers and/or consumers can hire workers for tasks on an as needed or on-demand basis. The people hired are referred to as "gig workers," who are contracted out by employers or consumers to perform a given task after which the gig worker is no longer employed and moves on a next employer or consumer in need of a task.

Gig workers have largely been associated with drivers or fast food delivery. However, not every industry is able to participate in the gig economy for a variety of reasons. Some jobs require licenses, certifications, and detailed background checks of employees. Moreover, a variety of national and state labor compliance laws and regulations have substantially driven employment costs up for employers.

As a result, employers have become adept at maintaining a lean workforce, which in many cases is comprised of part-time employees rather than full-time employees. However, some industries are struggling with managing a lean work force, particular employers associated with shift work. This is because planned part-time employees may miss scheduled shifts for a variety of emergencies or sickness and when this happens the employers must find an existing employee to fill in for any unstaffed shift. Notice of the employee's missed shift is usually very short, often just hours before the shift is scheduled to begin. Consequently, many managers find themselves filling in for missed shifts too frequently and often the shifts remain unstaffed.

The above-referenced scenario is particularly problematic in the restaurant industry. Additionally, underemployment is particular high in the restaurant industry because shift-based work often does not pay for employee's healthcare, retirement, and unpaid leave. Thus, working on a set shift of a changing shift schedule is simply not worth it to many workers especially when shifts often conflict with worker's daily family and social commitments. Many times, restaurant employees maintain the restaurant job as a second job rather than a primary job. As a result, the restaurant industry struggles to staff shifts and often having trouble keeping good managers because when shifts are missed it often falls on the manger to cover the missed shift.

SUMMARY

In various embodiments, methods and a system for a network-based work assignment platform are presented.

According to an aspect, a method for network-based work assignment platform is presented. Specifically, a plurality of employers and a plurality of workers are registered on a network-based work assignment platform. A temporary job posting is received on the network-based work assignment platform from a registered employer. A temporary job associated with the temporary job posting is matched on the network-based assignment platform to a registered employer. Performance of the temporary job and a payment to the registered worker are coordinated on the network-based work assignment platform when the temporary job is completed for the registered employer by the registered worker.

DETAILED DESCRIPTION

Figure 1:
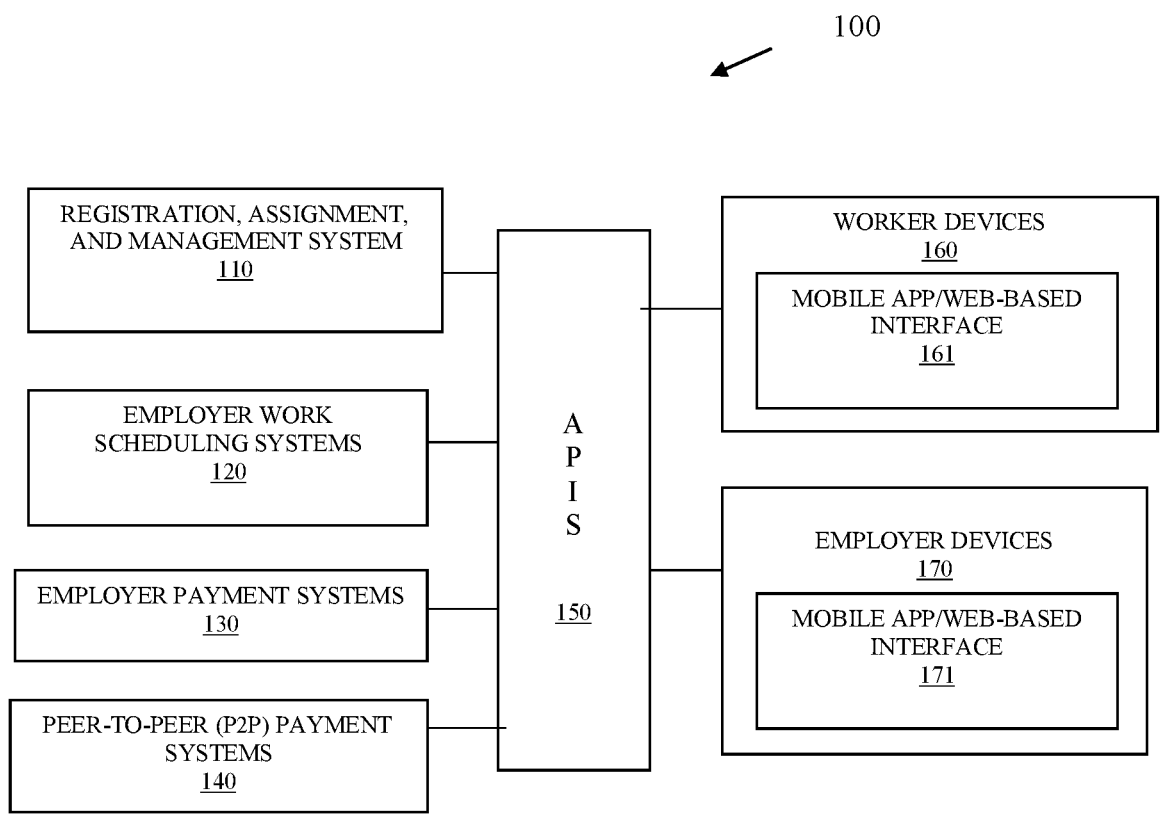
FIG. 1 is a diagram of a system for a network-based work assignment platform, according to an example embodiment.

FIG. 1 is a diagram of a system 100 for a network-based work assignment platform, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the teachings of providing and operating a network-based work assignment platform presented herein and below.

The system 100 provides a platform by which establishments can quickly and efficiently fill work assignments and/or shift-based work with available workers. The system 100 permits pairing of underemployed workers with open and unstaffed shifts of employers in need. The workers are vetted in accordance with employer-defined requirements before being matched with a given employer. The system 100 provides a digital and network-based marketplace for temporary and shift-based work shortages of employers and workers in need of or desiring work for wages. Furthermore, a variety of worker payment methods are used including peer-to-peer (P2P) payment systems.

The system 100 includes a registration, assignment, and management system 110 (may also be referred to herein as "registration system 110," "assignment system 110," and/or "management system 110"), employer work scheduling systems 120, employer payment systems 130, P2P payment systems 140, a plurality of Application Programming Interfaces (APIs) 150, worker devices 160, and employer devices 170.

The registration, assignment, and management system 110 includes a plurality of software modules comprising executable instructions. A server or a plurality of servers logically organized as a cloud processing environment (cloud) comprises hardware processors and non-transitory computer-readable storage media having the executable instructions. When the executable instructions are executed by the processors from the non-transitory computer-readable storage media, the processors perform the processing recited herein and below for the registration, assignment, and management system 110.

Similarly, systems 120, 130, and 140 include a plurality of software modules comprising executable instructions that are executed by processors on servers or clouds causing the corresponding processors to perform the processing discussed herein and below for systems 120, 130, and 140.

APIs 150 are executable instructions representing commands or operations that are executed by processors associated with the servers or clouds for systems 110-140 and/or devices 160 and 170.

Worker devices 160 include a mobile application (app)/web-based interface 161, which is executed as executable instructions by the corresponding processors of the worker devices 160 to perform the processing discussed herein and below for the mobile app/web-based interface 160.

Similarly, employer devices 160 include a mobile app/web-based interface 170, which is executed as executable instructions by the corresponding processors of employer devices 160 to perform processing discussed herein and below for employer devices 170.

Mobile apps/web-based interface 171 of employer devices 170 are operated by employers in need of filling a temporary or shift-based job at an establishment of requesting employers. An employer-based interface is presented on employer device 170, which permits the employer to define the job that is need, the time frame for the job, and requirements of an applicant seeking to take the defined job. The criteria for the job is defined through selections and entries made in the interface by the employer and mobile app/web-based interface 171 processes an API 150 to communicate the job and job criteria to registration, assignment, and management system 110.

It is noted that mobile app/web-based interface 171 also initially registers a given employer for the network-based work assignment platform through the employer-facing interface and APIs 150. Employer registration may entail identification of appropriate APIs 150 that allow registration, assignment, and management system 110 to access the corresponding registering employer's work scheduling system 120 and payment system 130. Initial employer registration may also permit an employer to register a P2P identifier or an account for a P2P payment system 140. APIs 150 may be processed by employer payment systems 130 and P2P payment systems 140 for payment coordination and audit/compliance tracking. Employer registration may also require documentation to be imaged through the interface and provided to registration, assignment, and management system 110 using APIs 150 for such things as evidence of a valid liquor license, food safety certification, other certifications, licenses, and physical locations of establishments of a registering employer.

In a similar manner, each of the individual workers operate interfaces provided by mobile app/web-based interface 161 on that individual's worker device 160 to register for temporary or shift-based work through the APIs 150 and registration, assignment, and management system 110. The registering worker also provides a variety of information through the interface, which is vetted for accuracy and truthfulness. Such information may include existing licenses, existing certifications, work history, work references and contact details, age, name, bank account, P2P payment identifier, etc. Mobile app/web-based interface 161 also reports the corresponding worker device's geolocation when interacting with registration, assignment, and management system 110.

After registration, employers and potential temporary employers (workers) are accessible through a network-based work assignment platform via system 100. The platform forms a network of employers and employees interconnected with one another via registration, assignment, and management system 110 utilizing or processing APIs 150.

An employer operates interface of that employer's device 170 to access the corresponding mobile app/web-based interface 171 that processes the corresponding APIs 150 and posts to the platform/network temporary work or shift with corresponding requirements/criteria for hiring a worker for that temporary work. This creates an opening for temporary work on the platform published and visible, in some cases, to corresponding workers seeking work through their mobile app/web-based interface 161.

Simultaneously, or even independently of the employer. A given employee may operating mobile app/web-based interface 161 of that employee's device 160 and post a request for work to the platform.

So, employers can post specific jobs that need to be filled for specific locations and specific work and workers can post requests for work at specific dates, times of day, day of week, and specific types of work. In some cases, workers may also request work assignments with specific employers on the platform.

Registration, assignment, and management system 110 also processes a matching algorithm to closely match specific workers with specific skill sets to specific employers for specific jobs. The matching can be based on a plurality of factors, such as ratings provided by registered workers for a given employer, ratings provided by registered employers for a given employee, criteria required by a given employer for the job posted, criteria requested or required by a given employee for a specific job and/or a specific employer, geographical location of the job relative to geographical location of the potential employees desiring the job, etc.

In an embodiment, registration, assignment, and management system 110 processes a trained machine-learning algorithm that was trained on a variety of input variables such as: geographical locations of employers and workers, day of week for a given job, calendar day for the given job, time of day required for the given job, criteria for the job, criteria desired by the worker, ratings of the employer, ratings for the employee, work history of employee, wage offered for the job, type of job, etc. The trained machine-learning is trained on the input and outcome ratings obtained after a job is finished as provided by the employer and employee. The machine-learning algorithm is thusly optimized to provide a ranked listing of matches between a an employer with a given job and a requesting employee.

Once the platform is populated with employers having jobs and workers requesting work, matches are made by registration, assignment, and management system 110 to match a given employer's posted job opening with a requesting worker. A single match or multiple matches of workers to a single job are sent via API 150 to mobile app/web-based interface 171 of the employer that needs to fill that job. The employer may see a ranked listing of potential workers to fill the job based on all the input provided for the job criteria and worker ratings. In an embodiment, the employer can when posting the job custom-define the criteria for ranking matches to the job. In an embodiment, mobile app/web-based interface 161 includes interface options that allows the employer to dynamically change the ranking and sorting of potential workers to dynamically re-render the rankings based on an employer-defined criterion or set of criteria made within the mobile app/web-based interface 161.

When an employer selects a worker for a given job while operating mobile app/web-based interface 171, the employer can provide instructions, key codes (employee code for time clock, cash register, door, safe, etc.), contact numbers, contact emails, employer name, etc. needed by the selected worker for filling the job, and such job-specific information is sent from mobile app/web-based interface 171 through API 150 to registration, assignment, and management system 110. Registration, assignment, and management system 110 notes the employer's acceptance in an audit trail maintained and forwards through the platform the offer for the job to the selected worker via API 150 to the corresponding worker's mobile app/web-based interface 161. The selected worker can then decline the job or accept the job through mobile app/web-based interface 161. In either case of acceptance or non-acceptance and audit trail is maintained by registration, assignment, and management system 110.

Assuming a selected worker accepts the job, the job-specific details are provided to the selected worker through mobile app/web-based interface 161. The selected worker and corresponding employer may then communicate outside the platform directly through out-of-band communications if needed (out-of-band from the network/platform through direct device-to-device texting, voice calls, emails, etc.

Once the worker completes the job based on an event raised or provided, such as the scheduled shift ends for the job and the event is raised through work scheduling system 120 through API 150 or the original posting employer or authorized delegate of the posting employer indicates through mobile app/web-based interface 171 the job is completed, registration, assignment, and management system 110 uses existing job criteria (wage rate or pay amount) to cause an invoice to be generated or a payment event to be raised through API 150 to a corresponding payment system 130 and/or P2P payment system 140.

Payment for a given job can be processed in a variety of manners including direct bank to bank transfers from the employer to the worker, direct P2P payments, end of week payments, check generated payments within a predefined period of time, etc. Payment timing and method of payment may also be detailed in the job criteria set by the employer when posting the job through the platform.

In an embodiment, the platform provided by system 100 is subscription based for the employer and/or worker, such that a monthly fee is charged for accessing the platform.

In an embodiment, the platform provided by system 100 is transactional based for employer and/or worker, such that predefined fees are collected for posting jobs, accepting jobs, and/or completing jobs.

In an embodiment, the platform provided by system 100 supports real-time payments and on-demand payment options to both the employer and/or worker. A worker (through mobile app/web-based interface 161) can opt-in to, and for a fee, be provided with an instant negotiated payment either at the time of acceptance by the worker or at a time that the worker clocks out. Any job that receives tips as part of its compensation can be provided a portion of the worker's tip share as well. Registration, assignment, and management system 110 generates invoices detailing payments and fees collected for the platform and can provide directly to the posting employer or the corresponding payment system 130 through APIs 150.

In an embodiment, the platform provided by system 100 can use a prefunded account to make payments for jobs on behalf of employers as jobs are completed. In this way, system 100 may not require access to the employer's banking information and payments are made through a prefunded deposit account, which the employer funded in advance of any completed job requiring payment.

In an embodiment, the platform provided by system 100 can uses its own bank account or P2P payment account to make payments for jobs on behalf of the employer. In such cases, a fee for advancing payment for jobs may be charged to the employer when the platform invoices employer for advancing the payments at negotiated intervals of time.

In an embodiment, each employer's hired workers are maintained by registration, assignment, and management system 110 and available for viewing and inspecting by the corresponding employer through mobile app/web-based interface 171. Such information can include working contact details, working assigned employee number, work history with the employer and other employers that the worker performed work for on the platform, wages earned to date, worker ratings, any comments provided by an employer for a given job performed by the worker, etc.

In an embodiment, registration, assignment, and management system 110 interacts with an employer's work scheduling systems 120 and/or Human Resources (HR) systems to integrated in a closed loop fashion all work history, comments, ratings, and payment history for any worker hired for a job of the employer. This may entail generating temporary time clock codes, employee codes, pass codes, etc. In this way, the platform of system 100 is fully integrated with existing systems of an employer and provides needed audit and compliance records for any hired worker (temporary employee).

The platform provided by system 100 supports the gig economy, which the industry is rapidly evolving towards. Employers are saved a significant amount of management time associated with filling jobs and the jobs can be filled in real time, such that when an existing employee has an emergency or is sick that employee's shift can be quickly filled with a fully vetted gig worker through the platform (which may also in turn improve the quality of life of some managers who are forced to work when an existing employee calls in sick or is otherwise unable to work a given shift). The gig workers are provided more control and certainty over earning wages by matching the workers with jobs in real time. Moreover, workers in need of cash to pay bills/rent can be paid in real time after performing the job.

The platform of system 100 is particular well suited to address shift-based jobs; although it may also be used for salary-based jobs that pay a set amount for a specific task.

In an embodiment, devices 160 and 170 can include any of: mobile phones, laptops, desktop computers, wearable processing devices, and network-based voice-enabled network appliances associated with the Internet-of-Things (IoTs).

In an embodiment, mobile app/web-based interfaces 161 and 171 support two-way video conferencing that permits the worker and the hiring employer to conduct interviews. In an embodiment and with acknowledgement of both parties, the video log is retained on behalf of the employer in an audit trail.

In an embodiment, mobile app/web-based interfaces 161 support a post job set of comments or survey in addition to the employer-provided rating of the worker and worker-provided rating of the employer. Registration, assignment, and management system 110 may generate a summary of a plurality of workers for a given employer detailing answers to the survey, comments, and worker-provided ratings. Such information may be used for continuous improvement of the employer in its operations.

In an embodiment, mobile app/web-based interfaces 161 and 171 provide a searching interface for employees and employers to defined criteria and search for corresponding workers and/or employers that currently satisfy the user-defined criteria and are available on the platform.

In an embodiment, mobile app/web-based interface 171 provides options for an employer to reach out directly to workers not listed as being currently available for a given job. In an embodiment, the employer can modify and raise the payment amount for a posted job based on a lack of any acceptable match to any worker that is currently available on the platform.

It is to be noted that system 100 may also be processed to coordinate offers (job shift offers) between workers to take each other's scheduled work shift. APIs may be processed through multiple mobile app/web-based interfaces 161/171 associated with multiple worker devices 160 or employer devices 170 for purposes of one worker posting an offer for a different worker to cover the posting worker's scheduled shift. For example, worker A may make an offer that is visible to worker B only or to all workers of a given employer) to take a scheduled shift for $20 (plus worker B who was not scheduled to work the shift of worker A receives payment for working the shift from the corresponding employer). Payment can be collected through a designated P2P payment system 140 of either worker A or worker B. Additionally, a manager associated with a given job performed may add payments to the worker that performed the job at the end of a shift that is separate from payment for performing the job. This may be used to add that worker's share of the tips that a worker had during a shift, which was not capable of being calculated until tips were calculated.

So, workers of a same employer may utilize the platform to make offers for other co-workers to pay them for taking scheduled shifts and such payment can be made instantly via a P2P Payment system 140. In fact, separate options may be presented to post within defined groupings of employees for a single employer to facilitate employees working out shifts on their own and making sure they are properly covered for the employer. Additionally, managers can facilitate late payments directly to a worker based on a discovered situation that necessitates additional payments beyond just an hourly rate for performing the job (which as stated above is particularly beneficial for tip-based jobs and workers).

These and other embodiments are now discussed with reference to FIGS. 2-4.

Figure 2:
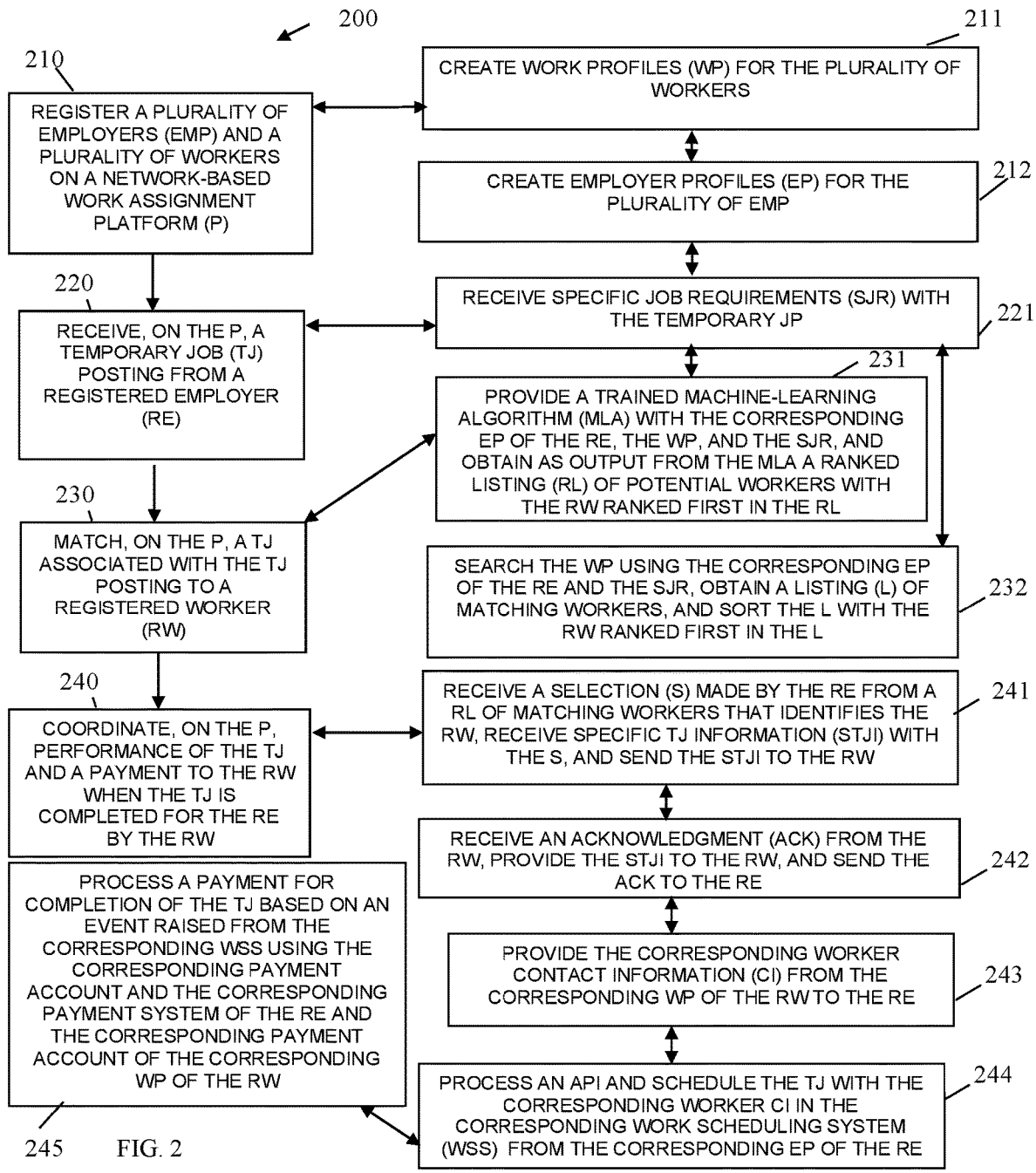
FIG. 2 is a diagram of a method for operating a network-based work assignment platform, according to an example embodiment.

FIG. 2 is a diagram of a method 200 for operating a network-based work assignment platform, according to an example embodiment. The software module(s) that implements the method 200 is referred to as a "work-assignment platform service." The work-assignment platform service is implemented as executable instructions programmed and residing within memory and/or a non-transitory computer-readable (processor-readable) storage medium and executed by one or more processors of a device. The processor(s) of the device that executes the work-assignment platform service are specifically configured and programmed to process the work-assignment platform service. The work-assignment platform service has access to one or more network connections during its processing. The network connections can be wired, wireless, or a combination of wired and wireless.

In an embodiment, the device that executes the work-assignment platform service is a server. In an embodiment, the server is a cloud processing environment that comprises multiple servers cooperating with one another as a single server.

In an embodiment, the work-assignment platform service is all of or some combination of 110-150.

In an embodiment, the work-assignment platform service is provided as a subscription-based private network over the Internet representing a network-based work assignment platform.

At 210, the work-assignment platform service registers a plurality of employers and a plurality of workers on a network-based work assignment platform. In an embodiment, the network-based work assignment platform requires user identifications and credentials, which are enforced by the work-assignment platform service during a login into the network-based work assignment platform.

In an embodiment, at 211, the work-assignment platform service creates work profiles for the plurality of workers. Each work profile comprising information supplied by a registering worker. The information, by way of example only, comprising: worker contact information, a geographic range assigned by the corresponding worker (an indication as to the geographical area that the worker is willing to work within), a payment account of the corresponding worker (can be a bank account or a P2P identifier for a P2P payment service), types of work desired by the corresponding worker, work references and reference contact information, worker contact information, a work history, any certifications held by the corresponding worker, any licenses held by the corresponding worker, and worker-defined job criteria for any job desired by the corresponding worker.

In an embodiment of 211 and at 212, the work-assignment platform service creates employer profiles for the plurality of employers. Each employer profile comprising information obtaining from a registering employer. The information comprising, by way of example only, payment accounts and payment systems of the corresponding employer (banking accounts and/or P2P payment identifiers for P2P payment systems), work scheduling systems of the corresponding employer, human resources systems of the corresponding employers, types of jobs offered by the corresponding employer, certifications and licenses of the corresponding employer, geographic locations of the jobs offered by the corresponding employer, and employer-defined job criteria for each of the jobs.

At 220, the work-assignment platform service receives, on the network-based work assignment platform, a temporary job posting from a registered employer.

In an embodiment of 212 and 220, at 221, the work-assignment platform service receives specific job requirements with the temporary job posting.

At 230, the work-assignment platform service matches, on the network-based work assignment platform a temporary job associated with the temporary job posting to a registered worker.

In an embodiment of 221 and 230, at 231, the work-assignment platform service provides a trained machine-learning algorithm with the corresponding employer profile of the registered employer, the worker profiles, and the specific job requirements. The work-assignment platform service obtains from the trained machine-learning algorithm a ranked listing of potential workers with the registered worker being ranked first in the ranked listing.

In an embodiment of 221 and 230, at 232, the work-assignment platform service searches the worker profiles using the corresponding employer profile of the registered employer and the specific job requirements for obtaining a listing of matching workers. The work-assignment platform service sorts the listing with the registered worker being ranked first in the listing.

At 240, the work-assignment platform service coordinates, on the network-based work assignment platform, performance of the temporary job and a payment to the registered worker when the temporary job is completed for the registered employer by the registered worker.

In an embodiment, at 241, the work-assignment platform service receives a selection made by the registered employer from a ranked listing of matching workers that identifies and includes the registered worker. The work-assignment platform service receives specific temporary job information with the selection and sends the specific temporary job information to the registered worker. The specific temporary job information can include a variety of information such as, by way of example only, a temporary employee number, a time-clock code, a pass code, contact information for a manager, directions to the temporary job site, and other information. In an embodiment, the work-assignment platform service maintains the specific temporary job information and supplies a link to the registered worker, which when activated from a worker device retrieves or displays the specific temporary job information.

In an embodiment of 241, at 242, the work-assignment platform service receives an acknowledgment from the registered worker, provides the specific temporary job information to the registered worker, and sends the acknowledgement to the registered employer.

In an embodiment of 242, at 243, the work-assignment platform service provides the corresponding worker contact information from the corresponding worker profile of the registered worker to the registered employer.

In an embodiment of 243, at 244, the work-assignment platform service processes an API and schedules the temporary job with the corresponding worker's contact information in the corresponding work scheduling system from the corresponding employer profile of the registered employer.

In an embodiment of 244, at 245, the work-assignment platform service processes a payment for completion of the temporary job based on an event raised from the corresponding work scheduling system using the corresponding payment account and the corresponding payment system of the registered employer along with the corresponding payment account from the corresponding worker profile associated with the registered worker.

Figure 3:
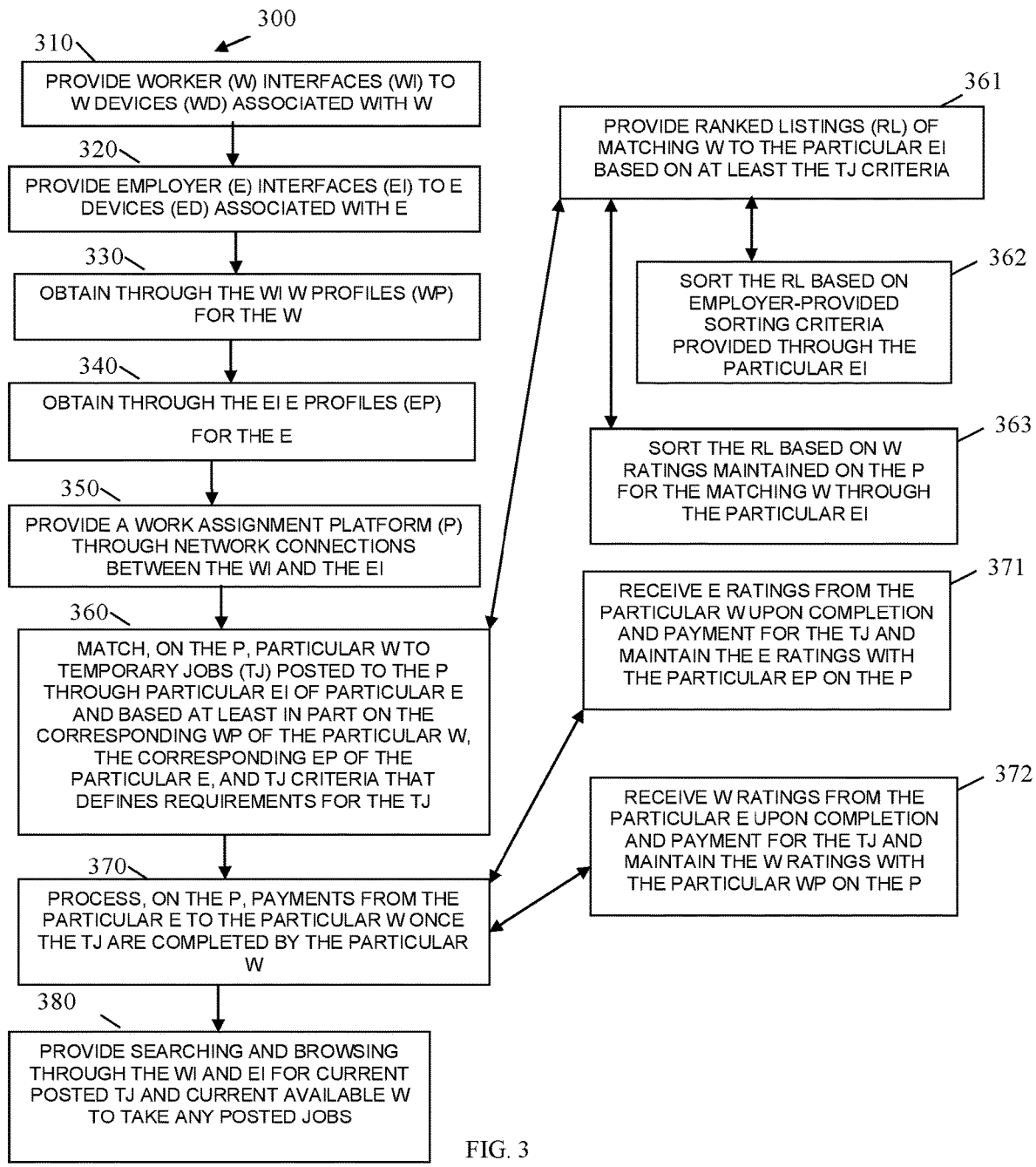
FIG. 3 is a diagram of another method operating a network-based work assignment platform, according to an example embodiment.

FIG. 3 is a diagram of another method 300 for operating a network-based work assignment platform, according to an example embodiment. The software module(s) that implements the method 300 is referred to as a "worker assignment manager." The worker assignment manager is implemented as executable instructions programmed and residing within memory and/or a non-transitory computer-readable (processor-readable) storage medium and executed by one or more processors of a device. The processors that execute the worker assignment manager are specifically configured and programmed to process the worker assignment manager. The worker assignment manager has access to one or more network connections during its processing. The network connections can be wired, wireless, or a combination of wired and wireless.

In an embodiment, the device that executes the worker assignment manager is a server. In an embodiment, the server is a cloud processing environment that comprises multiple servers cooperating with one another as a single server In an embodiment, the worker assignment manager is all or some combination of 110-150, and/or the method 200.

The worker assignment manager presents another and, in some ways, enhanced processing perspective to that which was described above with the FIG. 2.

At 310, the worker assignment manager provides worker interfaces to worker devices associated with workers.

At 320, the worker assignment manager provides employer interfaces to employer devices associated with employers.

At 330, the worker assignment manager obtains through the worker interfaces worker profiles for the workers.

At 340, the worker assignment manager obtains through the employer interfaces employer profiles for the employers.

At 350, the worker assignment manager provides a work assignment platform through network connections between the worker interfaces and the employer interfaces with the worker assignment manager.

At 360, the worker assignment manager matches, on the work assignment platform, particular workers to temporary jobs posted to the work assignment platform through particular employer interfaces of particular employers and based, at least in part, on the corresponding worker profiles of the particular workers, the corresponding employer profiles of the particular employers, and temporary job criteria that defines requirements for the temporary jobs.

In an embodiment, at 361, the worker assignment manager provides ranked listings of matching workers to the particular employer interfaces based on, at least in part, the temporary job criteria.

In an embodiment of 361 and at 362, the worker assignment manager sorts the ranked listings based on employer-provided sorting criteria provided through the particular employer interfaces.

In an embodiment of 361 and at 363, the worker assignment manager sorts the ranked listings based on worker ratings maintained on the work assignment platform for the matching workers through the particular employer interfaces.

At 370, the worker assignment manager processes, on or through the work assignment platform, payments from the particular employers to the particular workers once the temporary jobs are completed by the particular workers.

In an embodiment, at 371, the worker assignment manager receives employer ratings from the particular workers upon completion and payment for the temporary jobs. The worker assignment manager also maintains the employer ratings with the particular employer profiles on the work assignment platform.

In an embodiment, at 372, the worker assignment manager receives worker ratings from the particular employers upon completion and payment for the temporary jobs. The worker assignment manager also maintains the worker ratings with the particular worker profiles on the work assignment platform.

In an embodiment, at 380, the worker assignment manager provides searching and browsing operations through the worker interfaces and the employer interfaces for current posted temporary jobs and current available workers to take any posted jobs. The current posted temporary jobs and current available workers maintained by the worker assignment manager on the work assignment platform.

Figure 4:
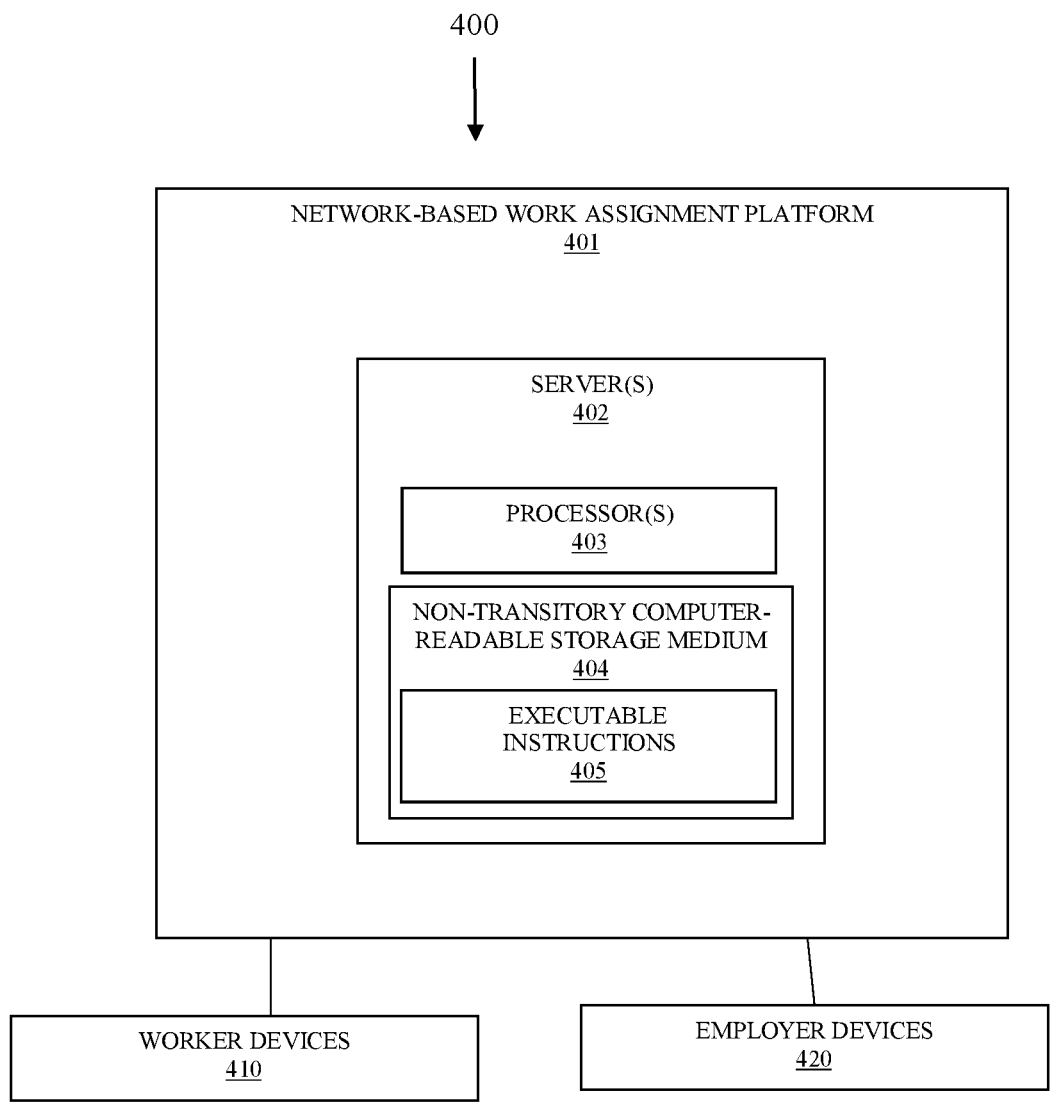
FIG. 4 is a diagram of another system for a network-based work assignment platform, according to an example embodiment.

FIG. 4 is a diagram of a system 400 for another network-based work assignment platform, according to an example embodiment. The system 400 includes a variety of hardware components and software components. The software components of the system 400 are programmed and reside within memory and/or a non-transitory computer-readable medium and execute on one or more processors of the system 400. The system 400 communicates over one or more networks, which can be wired, wireless, or a combination of wired and wireless.

In an embodiment, the system 400 implements, inter alia, the processing described above with the FIGS. 1-3.

The system 400 is the system 100.

The system 400 includes a network-based work assignment platform 401 comprising at least one server 402 having a processor 403 and a non-transitory computer-readable storage medium 404. The non-transitory computer-readable storage medium 404 comprising executable instructions 405. Worker devices 410 and employer devices 420 interact with the platform 401 and the server 402 through worker interfaces executing on processors of the worker devices 410 and through employer interfaces executing on processors of the employer devices 420.

In an embodiment, the executable instructions 405 is all of or some combination of: the registration, assignment, and management system 110, the APIs 150, the method 200, and/or the method 300.

The executable instructions 405 when executed by the processor 403 from the non-transitory computer-readable storage medium 404 of the server 401 cause the processor 403 to perform processing comprising: 1) maintaining worker profiles for workers subscribed to the network-based work assignment platform 401; 2) maintaining employer profiles for employers subscribed to the network-based work assignment platform 401; 3) posting on the network-based work assignment platform 401 temporary job openings as defined by the employers; 4) matching select workers to the temporary job openings based at least in part on the worker profiles, the employer profiles, and job-specific criteria provided in the temporary job openings; and 5) monitoring and processing, on the network-based work assignment platform 401, completion of temporary jobs associated with the temporary job openings and payments from the employers to the select workers.

In an embodiment, the executable instructions 405 when executed by the processor 403 from the medium 404 further cause the processor 403 to perform additional processing comprising: 1) providing a first API to worker interfaces of worker devices 410 associated with the workers to interface from the worker devices 410 with the network-based work assignment platform 401; and 2) providing a second API to employer interfaces to employer devices 420 associated with the employers to interface from the employer devices 420 with the network-based work assignment platform 401.

In an embodiment, the worker interfaces and the employer interfaces comprise one or more of: a mobile application and a web-based or browser-based interface accessible through a browser.

In an embodiment, the at least one server 401 comprises a plurality of servers 401 logically organized and cooperating as a cloud processing environment (cloud).

In an embodiment, worker devices 410 and employer devices 420 comprise one or more of: mobile phones, tablets, laptops, desktop computers, wearable processing devices, and network-based voice-enabled devices (IoTs devices).

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:
registering, by a processor of an assignment platform, employers for access to the assignment platform;
training, by the processor, a machine-learning algorithm on input data associated with jobs performed by workers of the employers and ratings provided by the employers for the jobs and the workers to produce output associated with ranked potential workers when provided a given input associated with a given job of a given employer;
receiving, by the processor, a current job posted from a certain registered employer to the assignment platform;
providing, by the processor, the current job as input to the machine-learning algorithm;
receiving, by the processor, a current ranked listing of the potential workers as output from the machine-learning algorithm; and
providing, by the processor, the current ranked listing of the potential workers to the certain registered employer within the assignment platform.

2. The method of claim 1 further comprising, maintaining, by the processor, worker profiles for the workers and providing, by the processor, access to the corresponding worker profiles within the current ranked listing of the potential workers to the certain registered employer within the assignment platform.

3. The method of claim 2, wherein training further includes providing the worker profiles as a portion of the input data to the machine-learning algorithm during the training.

4. The method of claim 1, wherein receiving the current job posted further includes identifying the current job as a temporary job associated with the certain registered employer to cover one or more shifts of work open with the certain registered employer.

5. The method of claim 1, wherein providing the current ranked listing further includes filtering out selective potential workers based on employer-defined requirements associated with the current job and the certain registered employer before providing the current ranked listing.

6. The method of claim 1 further comprising, providing, by the processor, the assignment platform through a website accessible to devices of the registered employers through a browser.

7. The method of claim 1 further comprising, providing, by the processor, the assignment platform through a mobile application on mobile devices of the registered employers.

8. The method of claim 1, wherein registering further includes obtaining images of licenses and certifications from each of the registered employers through the assignment platform.

9. The method of claim 1 further comprising, coordinating, by the processor, performance of the current job and payment by the certain registered employer to a selected worker from the current ranked listing through the assignment platform.

10. The method of claim 9 further comprising, maintaining, by the processor, an audit and compliance record for the current job on behalf of the selected worker and the certain registered employer.

11. The method of claim 1 further comprising, registering, by the processor, the potential workers for access to the assignment platform.

12. A method, comprising:
   registering, by a processor of an assignment platform, workers as registered workers for access to the assignment platform;
   registering, by the processor, employers as registered employers for access to the assignment platform;
   training, by the processor, a machine-learning algorithm to receive as input worker profiles for the registered workers, employer profiles for the registered employers, and jobs posted by the registered employers to optimally produce a ranked listing of potential workers based on ratings provided by the corresponding registered employers for the corresponding registered workers the performed the corresponding jobs;
   receiving, by the processor, a current job posted by a current registered employer on the assignment platform;
   providing the current job, the worker profiles, and the profile of the current registered employer as input to the machine-learning algorithm;
   receiving, by the processor, a current ranked listing of potential workers as output from the machine-learning algorithm; and
   providing, by the processor, the current ranked listing to the current registered employer through the assignment platform.

13. The method of claim 12 further comprising providing, by the processor, the worker profiles associated with the current ranked listing of potential workers to the current registered employer through the assignment platform.

14. The method of claim 12 further comprising, providing, by the processor, an interface on the assignment platform for the registered workers to search and to browse posted and unfilled jobs associated with the registered employers.

15. The method of claim 12 further comprising, providing, by the processor, an interface on the assignment platform for the registered employers to search and to browse the worker profiles and ratings provided by certain registered employers that used a corresponding worker for a certain job.

16. The method of claim 12, wherein providing the current ranked listing further includes modifying the current ranked listing based on criteria associated with the employer profile of the current registered employer and providing a modified current ranked listing to the current registered employer through the assignment platform.

17. The method of claim 12 further comprising, facilitating, by the processor, a payment to a certain worker selected by the current registered employer for the current job through the assignment platform when the current registered employer confirms completion of the current job by the certain worker.

18. The method of claim 12 further comprising, providing, by the processor access to the registered workers and the registered employers to the assignment platform through browser interfaces and mobile application interfaces.

19. A system, comprising:
   a server that comprises at least one processor; and
   the at least one processor configured to perform operations comprising:
      maintaining an assignment platform with access restricted to registered employers and registered workers;
      providing potential worker recommendations for jobs posted by the registered employers on the assignment platform to the registered employers based on ratings associated with the registered workers for previous performed jobs, worker profiles, and registered employer employers;
      maintaining audit and compliance records for the registered workers and the registered employers for completed jobs; and
      facilitating payments between the registered employers and the registered workers for the completed jobs.

20. The system of claim 19, wherein the operations further comprise:
   providing browser-based interfaces and mobile application interfaces to the registered workers and the registered employers for accessing the assignment platform.

* * * * *